W. A. TURBAYNE.
STARTING AND GENERATING SYSTEM.
APPLICATION FILED APR. 11, 1918.

1,342,409.

Patented June 1, 1920.

WITNESS:
Romaine A. Kinne
Ralph Munden

INVENTOR.
William A. Turbayne.
BY
Raymund H. Van West
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STARTING AND GENERATING SYSTEM.

1,342,409. Specification of Letters Patent. Patented June 1, 1920.

Application filed April 11, 1918. Serial No. 227,852.

*To all whom it may concern:*

Be it known that I, WILLIAM A. TURBAYNE, a citizen of the United States, residing at Niagara Falls, in the county of Niagara and State of New York, have invented new and useful Improvements in Starting and Generating Systems, of which the following is a specification.

The present invention relates to starting and generating systems.

More particularly the present invention relates to mechanism applicable to the starting and lighting of automobiles wherein energy from a storage battery is used through the agency of dynamo-electric machinery for starting an internal combustion engine, the energy developed by said engine being used in restoring energy to said storage battery for future starting operations, for lighting the lights of the automobile and for other purposes.

An object of the present invention is to provide mechanism which will provide a strong torque for starting purposes while conserving material to advantage.

A further object is to provide mechanism which will provide the required torque for starting purposes and which will deliver current at the proper voltage for charging a storage battery, which mechanism will be simple in construction and inexpensive to manufacture.

A further object is to provide a dynamo-electric machine having a pair of armatures which are adapted to operate cumulatively for motoring functions, but only one of which is operative for generating functions, said dynamo-electric machine being inherently regulated whereby to control the output thereof.

Further objects will be apparent as the description proceeds.

Referring now to the drawings—

The dynamo-electric machine chosen to illustrate the present invention, comprises a pair of armatures 1 and 2 mounted on separate shafts and coöperatively arranged with a single field structure 3. One of the armatures is of low resistance and the other of comparatively high resistance, for reasons that will appear hereinafter. When motoring, the armatures act cumulatively to convert electrical energy from a storage battery to mechanical energy for engine starting purposes. When generating, however, only the high resistance armature is rotated.

Figure 2:
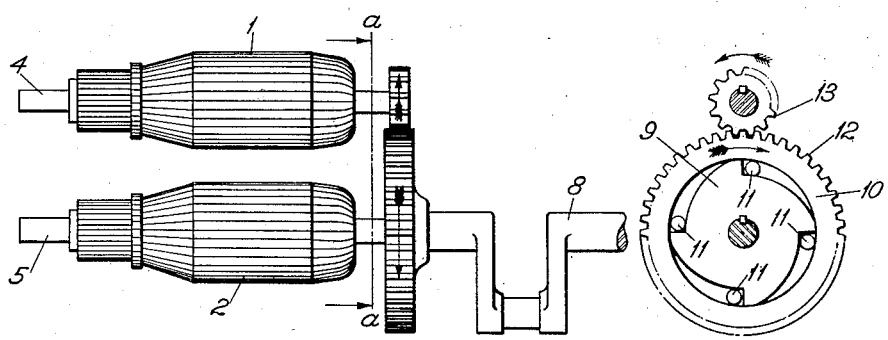
Fig. 2 represents a detail in side elevation.
Figure 3:
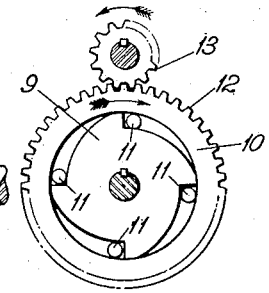
Fig. 3 is a view taken along the line *a—a* of Fig. 2.

The armature 1 is mounted upon a shaft 4, while armature 2 is mounted upon the shaft 5. As indicated in Fig. 2, said shafts are in substantial parallelism. The field frame 3 is provided with a pair of salient pole pieces 6, 6, which are arranged opposite to one another and between armatures 1 and 2. The field frame 3 is provided with a third salient pole 7 which is displaced substantially 90 degrees from the pole pieces 6, 6.

The armature 1 carries a small number of active armature conductors of large cross-sectional dimensions as compared with armature 2, which carries a greater number of active armature conductors of relatively small cross-sectional dimension. The armature 1 is accordingly of low resistance and armature 2 of high resistance.

The crank shaft of an internal combustion engine, which crank shaft is indicated by the numeral 8, may be directly coupled to the shaft 5 of the armature 2. The shaft 5 has keyed thereto one member, indicated by the numeral 9, of an overrunning clutch, the coöperating member of which is indicated by the numeral 10. The member 9 is provided with cam-shaped recesses, each of which is provided with a roller member 11. The outer periphery of the member 10 is provided with a gear 12 adapted to mesh with the gear 13 keyed to the shaft 4 of the armature 1.

Figure 1:
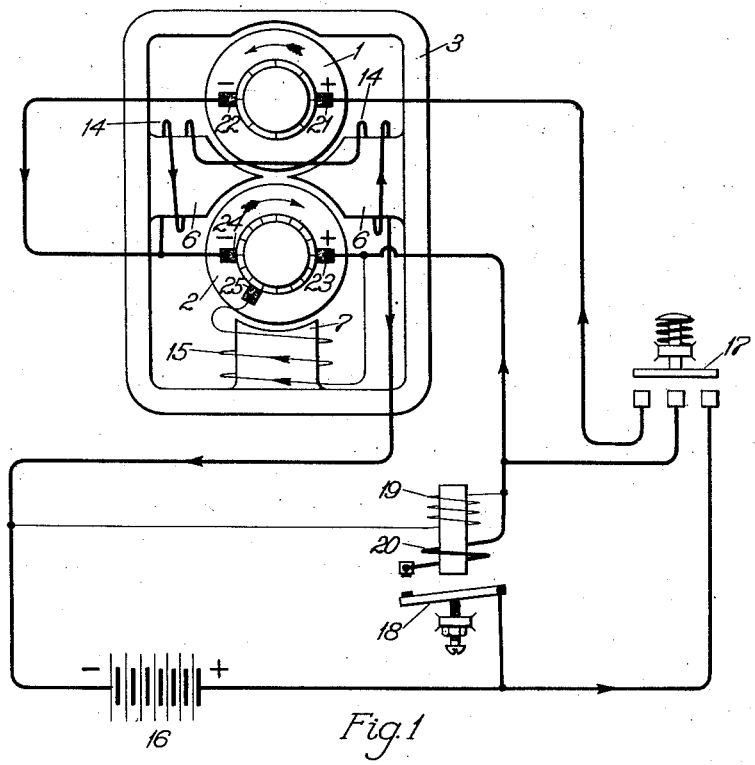
Figure 1 represents diagrammatically one embodiment of the present invention.

The electrical connections of the system, according to the present invention, are illustrated in Fig. 1. The pole pieces 6, 6, are provided with windings 14, 14, which may be referred to as series windings. The pole piece 7 is provided with a winding 15 which may be referred to as a shunt field winding. A storage battery for supplying current to the dynamo-electric machine is indicated by the numeral 16. Said storage battery 16 is connected to the dynamo-electric machine through a plurality of conductors which are controlled by the manually operable switch 17. The armature 2 is also adapted to be connected to supply current to the storage battery 16 through the automatic switch 18. Said switch 18 is provided with the usual lifting coil 19 which is adapted to be energized in response to the voltage across armature 2. The automatic switch 18 is also provided with the usual holding coil 20 which operates in a manner well understood to act cumulatively with the coil 19 as long as the armature 2 is supplying current to the storage battery and which will have a differential action with respect to the winding 19 when the voltage across the armature 2 falls below that of the battery, whereby a reverse current will tend to flow.

The armature 1 is provided with a pair of diametrically placed brushes 21, 22. The armature 2 is provided with a pair of diametrically placed brushes 23, 24. The armature 2 is provided with a third brush 25. The shunt field winding 15 is connected between said third brush 25 and one of said main brushes between which the potential difference decreases as the flux through the armature is distorted, due to the cross flux set up by the current in the armature conductors. Said shunt field winding is illustrated as being connected between main brush 23 and brush 25.

When the operator desires to start the internal combustion engine, he will close the switch 17, whereby the positive terminal of storage battery 16 will be connected to brush 21 and to brush 23. Current may now flow from the positive terminal of storage battery 16, through armatures 1 and 2 in parallel, through series windings 14, 14, to the negative terminal of the storage battery. A small amount of current will also be diverted through shunt field windings 15, though the effect of said shunt field winding, due to its high resistance, will be of only small consequence under starting operations. Windings 14, 14 will be so designed as to direct flux upward through armature 1 and downward through armature 2, whereby said armatures will be caused to rotate in opposite directions. The armature 2, inasmuch as it is coupled to the crank shaft 8 of the internal combustion engine, will operate to turn said crank shaft. Armature 1, operating through gear 13, will drive the gear 12 in the direction whereby the rollers 11, 11, will be forced into wedging engagement between clutch members 9 and 10, whereby said armature 1 will operate through said clutch members 9 and 10 to act cumulatively with armature 2 to exert torque on crank shaft 8.

Each of the armatures 1 and 2 will be subjected to substantially the same amount of magnetic flux. In order that each armature shall develop the same C. E. M. F. when motoring, and therefore prevent the exchange of current between them, the machine is constructed with a ratio of the number of active conductors in the two armatures respectively in inverse proportion to the speed ratio of said armatures as determined by the gears 13 and 10. Due to this arangement, the same value of field flux is threaded by the same number of conductors per revolution. Consequently, equal C. E. M. F.'s are developed in the two armatures. No circulation of current between said armatures will occur.

After the internal combustion engine has been started and is operating under its own power, the operator will release the starting switch 17. Said internal combustion engine will drive the armature 2, since said armature 2 is directly connected to the countershaft 8. Rotation of the clutch member 9 will result in freeing the rollers 11 from wedging engagement with the clutch member 10 and said clutch member 10 will become idle, whereby armature 1 will not be rotated.

When the internal combustion engine is driving armature 2 at a speed sufficient to develop a voltage substantially equal to or greater than a predetermined value, the lifting coil 19 will be sufficiently energized to close the automatic switch 18, whereby armature 2 will now supply storage battery 16 through brush 23, automatic switch 18, returning through series coil 14, 14, through brush 24 to armature 2. As soon as the armature conductors carry an appreciable amount of current they will set up a cross flux to thereby distort the E. M. F.'s developed around the commutator of armature 2 in a manner well understood. The brush 25 will be so located that its difference of potential with brush 23 will fall off as the current in the armature conductors, and consequently the flux distortion, increases. Consequently, the greater the tendency for current rise in the conductors of armature 2, the less will be the energization of the shunt field winding 15, whereby the current output of armature 2 will be held from exceeding a predetermined value.

It will be apparent from the description above that the cumulative action of the two armatures will result in a very considerable torque with an economical disposition of material. Under generating conditions, the output will be effectually controlled, whereby proper charging current may be delivered at the necessary voltage for charging the storage battery 16. Though a single field member has been illustrated, it will be understood that the invention is not limited to this construction.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States is—

1. In a starting and generating system, in combination, a pair of armatures acting cumulatively under motoring conditions, only one of which is adapted to operate under generating conditions, windings for directing flux through said two armatures, each of said armatures having a pair of main brushes connected in series with said windings, said one armature being provided with a third brush, a shunt field winding for said one armature connected between said third brush and one of said main brushes, and switch means for directing current through said armature in parallel for motoring functions.

2. In a starting and generating system, a dynamo-electric machine having in combination a pair of armatures acting cumulatively under motoring conditions, clutch mechanism between said armatures whereby only one of said armatures has generating functions under generating conditions, series field windings for directing flux through both said armatures, a shunt field winding for directing flux through one only of said armatures, said last mentioned armature having a pair of main brushes connected in series circuit with said series field windings, and a third brush between which and one of said main brushes, the shunt field winding is connected.

3. In a dynamo-electric machine, in combination, a single field frame, a pair of armatures acting cumulatively under motoring conditions, only one of which is adapted to have generating functions under generating conditions, means for directing flux through both said armatures, and a field winding for directing flux through one only of said armatures, said field winding being connected across said one armature between points whose potential difference decreases materially under the influence of armature cross flux.

4. In a starting and generating system, in combination, a dynamo-electric machine having a pair of armatures acting cumulatively under motoring conditions, a storage battery, a starting switch for connecting said armatures in parallel to said battery, an automatic switch for connecting one of said armatures to said battery for charging purposes, said dynamo-electric machine having windings for directing flux through both said armatures, and another winding for directing flux through one only of said armatures, said last mentioned winding being connected across said one armature between points whose potential difference decreases under the influence of armature cross flux.

5. In a starting and generating system, in combination, a dynamo-electric machine having a pair of armatures acting cumulatively under motoring conditions, a storage battery, a starting switch for connecting said armatures in parallel to said battery, an automatic switch for connecting one of said armatures to said battery for charging purposes, said dynamo-electric machine having windings for directing flux through both said armatures, another winding for directing flux through one only of said armatures, said last mentioned winding being connected across said one armature between points whose potential difference decreases under the influence of armature cross flux, and clutch mechanism between said armatures for mechanically connecting said armatures together during motoring functions and to disconnect same under generating conditions.

In witness whereof I have hereunto subscribed my name.

WILLIAM A. TURBAYNE.